(12) United States Patent
Trim et al.

(10) Patent No.: US 12,081,508 B2
(45) Date of Patent: Sep. 3, 2024

(54) FEEDBACK ENABLED NETWORK CURATION OF RELEVANT CONTENT THREAD

(71) Applicant: INTERNATIONAL BUSINESS MACHINES CORPORATION, Armonk, NY (US)

(72) Inventors: Craig M. Trim, Ventura, CA (US); Shikhar Kwatra, Durham, NC (US); Zachary A. Silverstein, Austin, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 16/451,386

(22) Filed: Jun. 25, 2019

(65) Prior Publication Data
US 2020/0412682 A1 Dec. 31, 2020

(51) Int. Cl.
*H04L 51/52* (2022.01)
*G06F 9/54* (2006.01)
(Continued)

(52) U.S. Cl.
CPC .............. *H04L 51/52* (2022.05); *G06F 9/542* (2013.01); *G06F 16/958* (2019.01); *H04L 51/224* (2022.05); *H04L 51/234* (2022.05)

(58) Field of Classification Search
CPC ......... H04L 51/32; H04L 51/24; H04L 51/34; G06F 16/958; G06F 9/542
See application file for complete search history.

(56) References Cited

U.S. PATENT DOCUMENTS 7,730,216 B1 6/2010 Issa et al.
10,122,808 B2 * 11/2018 Vickrey ............ G06F 16/24578
(Continued)

OTHER PUBLICATIONS

Mell et al., "The NIST Definition of Cloud Computing", NIST, Special Publication 800-145, Sep. 2011, 7 pages.
(Continued)

*Primary Examiner* — William G Trost, IV
*Assistant Examiner* — Abdelbasst Talioua
(74) *Attorney, Agent, or Firm* — Rakesh Roy; Andrew D. Wright; Calderon Safran & Wright P.C.

(57) ABSTRACT

A computer-implemented method includes identifying, by a computer device, particular users of a digital publishing platform, the particular users being users that have commented on previous content published by a first user; identifying, by the computer device, correlated users, the correlated users being those particular users that have published a pertinent comment; assessing, by the computer device, a satisfaction level of the first user with each pertinent comment; identifying, by the computer device and based on the assessing, a set of users of the correlated users, each of the correlated users in the set of users having published a pertinent comment having a satisfaction level above a threshold; notifying, by the computer device, the set of users that the first user has published new content; detecting, by the computer device, new comments by the correlated users in the set of users, the new comments pertaining to the new content; assessing, by the computer device, a satisfaction level of the first user with each new comment; and updating, by the computer device, the set of users based on the satisfaction level of the first user with each new comment.

19 Claims, 8 Drawing Sheets

(51) Int. Cl.
*G06F 16/958* (2019.01)
*H04L 51/224* (2022.01)
*H04L 51/234* (2022.01)

(56) References Cited

U.S. PATENT DOCUMENTS

| | | | | |
|---|---|---|---|---|
| 10,277,540 | B2* | 4/2019 | Arghandiwal | H04L 51/216 |
| 10,341,278 | B2* | 7/2019 | Hawkins | H04L 51/52 |
| 10,817,557 | B1* | 10/2020 | Knas | G06F 16/435 |
| 2007/0271502 | A1* | 11/2007 | Bedi | G06F 40/186 |
| | | | | 715/255 |
| 2009/0019078 | A1* | 1/2009 | Chisholm | G09B 5/00 |
| 2009/0319436 | A1* | 12/2009 | Andra | G06Q 50/188 |
| | | | | 704/9 |
| 2010/0318571 | A1 | 12/2010 | Pearlman et al. | |
| 2011/0320373 | A1* | 12/2011 | Lee | H04L 51/52 |
| | | | | 715/758 |
| 2012/0110088 | A1 | 5/2012 | Su et al. | |
| 2012/0158753 | A1* | 6/2012 | He | G06F 16/957 |
| | | | | 707/752 |
| 2012/0192086 | A1* | 7/2012 | Ghods | H04L 12/1859 |
| | | | | 715/753 |
| 2013/0113952 | A1* | 5/2013 | Misawa | G06T 11/60 |
| | | | | 348/222.1 |
| 2013/0275527 | A1* | 10/2013 | Deurloo | G06F 16/2477 |
| | | | | 709/206 |
| 2014/0067702 | A1 | 3/2014 | Rathod | |
| 2014/0164938 | A1* | 6/2014 | Petterson | G06F 3/048 |
| | | | | 715/739 |
| 2015/0089399 | A1* | 3/2015 | Megill | H04L 12/1813 |
| | | | | 715/753 |
| 2015/0381555 | A1* | 12/2015 | Faller | H04L 51/52 |
| | | | | 709/206 |
| 2016/0004410 | A1* | 1/2016 | Srinivasan | G06F 3/0482 |
| | | | | 715/810 |
| 2016/0030834 | A1* | 2/2016 | Brown | G06Q 30/0631 |
| | | | | 463/36 |
| 2016/0117289 | A1* | 4/2016 | Pan | G06F 40/169 |
| | | | | 715/230 |
| 2017/0039867 | A1* | 2/2017 | Fieldman | G09B 7/00 |
| 2017/0109838 | A1* | 4/2017 | Byron | G06F 16/23 |
| 2017/0142044 | A1* | 5/2017 | Ball | G06Q 30/02 |
| 2017/0155613 | A1* | 6/2017 | Ganci, Jr. | H04L 67/306 |
| 2017/0264954 | A1* | 9/2017 | Nakagawa | H04N 21/44008 |
| 2017/0289619 | A1* | 10/2017 | Xu | H04N 21/25866 |
| 2017/0295249 | A1* | 10/2017 | Vickrey | H04L 65/403 |
| 2017/0311040 | A1* | 10/2017 | Barnes | H04N 21/4334 |
| 2017/0345079 | A1* | 11/2017 | Rangan | G06F 16/951 |
| 2018/0039700 | A1* | 2/2018 | Greenberger | G06V 30/224 |
| 2018/0041458 | A1* | 2/2018 | Hawkins | G06Q 10/10 |
| 2018/0048599 | A1* | 2/2018 | Arghandiwal | H04L 51/216 |
| 2018/0053197 | A1* | 2/2018 | Chan | G06Q 30/0201 |
| 2018/0123993 | A1* | 5/2018 | Song | H04L 51/42 |
| 2018/0158099 | A1 | 6/2018 | Fored et al. | |
| 2018/0197109 | A1* | 7/2018 | Taylor | H04L 67/306 |
| 2018/0246569 | A1* | 8/2018 | Arakawa | G06F 3/013 |
| 2018/0302482 | A1* | 10/2018 | Haon | G06Q 10/107 |
| 2018/0309710 | A1 | 10/2018 | Sutton et al. | |
| 2019/0199919 | A1* | 6/2019 | Systrom | G06F 16/955 |
| 2020/0257762 | A1* | 8/2020 | Eskamani | G06N 20/00 |

OTHER PUBLICATIONS

Narang, "Top 12 Social Media Automation Tools to use in 2018", https://www.jeffbullas.com/11-best-social-media-automation-tools-smart-content-marketers/, jeffbullas.com, accessed Jun. 21, 2019, 9 pages.

Anonymous, "Social Media Analytics Market by Application & Region—Global Forecast 2022", https://www.marketsandmarkets.com/PressReleases/social-media-analytics.asp, Market and Markets, accessed Jun. 21, 2019, 12 pages.

* cited by examiner

FEEDBACK ENABLED NETWORK CURATION OF RELEVANT CONTENT THREAD

BACKGROUND

The present invention relates generally to digital publishing platforms and, more particularly, to improving the quality of comments received in response to content published on a digital publishing platform.

In social network sites, users can share practically any post and, accordingly, the post will be visible to other users as per the defined security of the post. A post can have textual content, image content, video content, or a combination of any or all of these. Once the post is visible to other users of the network site (connections, friends, etc., of the user), then the other users can post comments regarding the original post.

SUMMARY

In a first aspect of the invention, there is a computer-implemented method that includes: identifying, by a computer device, particular users of a digital publishing platform, the particular users being users that have commented on previous content published by a first user; identifying, by the computer device, correlated users, the correlated users being those particular users that have published a pertinent comment; assessing, by the computer device, a satisfaction level of the first user with each pertinent comment; identifying, by the computer device and based on the assessing, a set of users of the correlated users, each of the correlated users in the set of users having published a pertinent comment having a satisfaction level above a threshold; notifying, by the computer device, the set of users that the first user has published new content; detecting, by the computer device, new comments by the correlated users in the set of users, the new comments pertaining to the new content; assessing, by the computer device, a satisfaction level of the first user with each new comment; and updating, by the computer device, the set of users based on the satisfaction level of the first user with each new comment.

In another aspect of the invention, there is a computer program product including a computer readable storage medium having program instructions embodied therewith. The program instructions are executable by a computing device to cause the computing device to: identify particular users of a digital publishing platform, the particular users being users that have commented on previous content published by a first user; identify correlated users, the correlated users being those particular users that have published a pertinent comment; assess a satisfaction level of the first user with each pertinent comment; identify, based on the assessing, a set of users of the correlated users, each of the correlated users in the set of users having published a pertinent comment having a satisfaction level above a threshold; notify the set of users that the first user has published new content; detect new comments by the correlated users in the set of users, the new comments pertaining to the new content; assess a satisfaction level of the first user with each new comment; and update the set of users based on the satisfaction level of the first user with each new comment.

In another aspect of the invention, there is system including a processor, a computer readable memory, and a computer readable storage medium. The system includes: program instructions to review previous content published by a first user on a digital publishing platform; program instructions to determine topics of the previous content; program instructions to identify particular users of the digital publishing platform, the particular users being users that have commented on the previous content published by the first user; program instructions to identify correlated users, the correlated users being those particular users that have published a pertinent comment, the pertinent comment being a comment that pertains to a portion of the previous content that has a topic that is related to a topic of new content published by the first user; program instructions to assess a satisfaction level of the first user with each pertinent comment; program instructions to identify, based on the assessing, a set of users of the correlated users, each of the correlated users in the set of users having published a pertinent comment having a satisfaction level above a threshold; program instructions to notify the set of users that the first user has published the new content; program instructions to detect new comments by the correlated users in the set of users, the new comments pertaining to the new content; program instructions to assess a satisfaction level of the first user with each new comment; and program instructions to update the set of users based on the satisfaction level of the first user with each new comment. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to digital publishing platforms and, more particularly, to improving the quality of comments received in response to content published on a digital publishing platform. According to aspects of the invention, content previously published by a user on a digital publishing platform is analyzed along with comments made by other users that have commented on the content previously published by the user. The analysis determines a set of the other users that should be notified of new content relating to a particular topic published by the user in order for the user to receive the most useful comments regarding the particular new content. In embodiments, the analysis is iterative in that it updates the set of other users that should be notified when new content relating to the particular topic is published by the user and/or when a satisfaction level of the user with comments received is below a threshold. In this manner, implementations of the invention provide the user with a continually improving set of other users from which the user can obtain comments regarding the user's published content.

As stated above, on social network sites, once a post is visible to friends/connections of a user, then the friends/connections can post comments in response to the post. On some of these sites, any friend/connection can publish a comment in response to the post, and many friends/connections may not comment on the post. In this situation, the user may receive many comments that they do not want, and may not receive comments that they would like to receive. In some cases, based on the topic of any post, the user might want to get comments explicitly from some specific friends. For example, a user that has posted content related to "Industrial Financial Growth" may want to get the comments from specific friends/connections that have experience in financial matters.

Embodiments of the invention include an iterative feedback or reinforcement learning process to curate a list of desired commenters based on the user's satisfaction level with comments previously posted by, for example, a list of trusted friends. Embodiments correlate the user's satisfaction level with respect to a certain thread/posted content based on inspecting feedback from a selected group of chosen and trusted people who are initially capable of responding/commenting to that certain thread/posted content, and curate the list of responders/commenters for future posts. Hence, embodiments include methods and systems where the content correlation is executed in conjunction with the user's satisfaction level in order to curate the list of friends/trusted people capable of responding to a given thread based on feedback obtained from previous posts, threads, or topics. For simplicity, it is noted that in this disclosure the term "comment" is understood to include comments, opinions, "likes", and any other responses to a post or other comment, opinion, "like", or other response. In addition, it is noted that the terms "friend", "connection", and "contact" are used interchangeably to mean a user of a system that has some sort of connection to another user of the system.

Embodiments of the invention dynamically identify a group of users whose feedback would be useful and relevant to the user posting particular content. Embodiments include a way of understanding "about to be" posted content in a proactive fashion, and then distribute the content to a selective group dynamically. This is based on identifying the group of people whose comments would matter to the user, assessing the user's satisfaction level pertaining to comments by the group of people on a certain thread, and curating the list of people to improve the quality of comments received currently and/or in the future.

Implementations of the invention improve the performance of a digital publishing computer system by reducing the number of irrelevant and/or unwanted comments received by a user of the system and, therefore, reducing the need for computing resources and storage capacity. Implementations of the invention add the unconventional step of iterative improvement of a set of other users notified of user content, where the iterative improvement is based on the user's reaction to previous comments by the other users.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
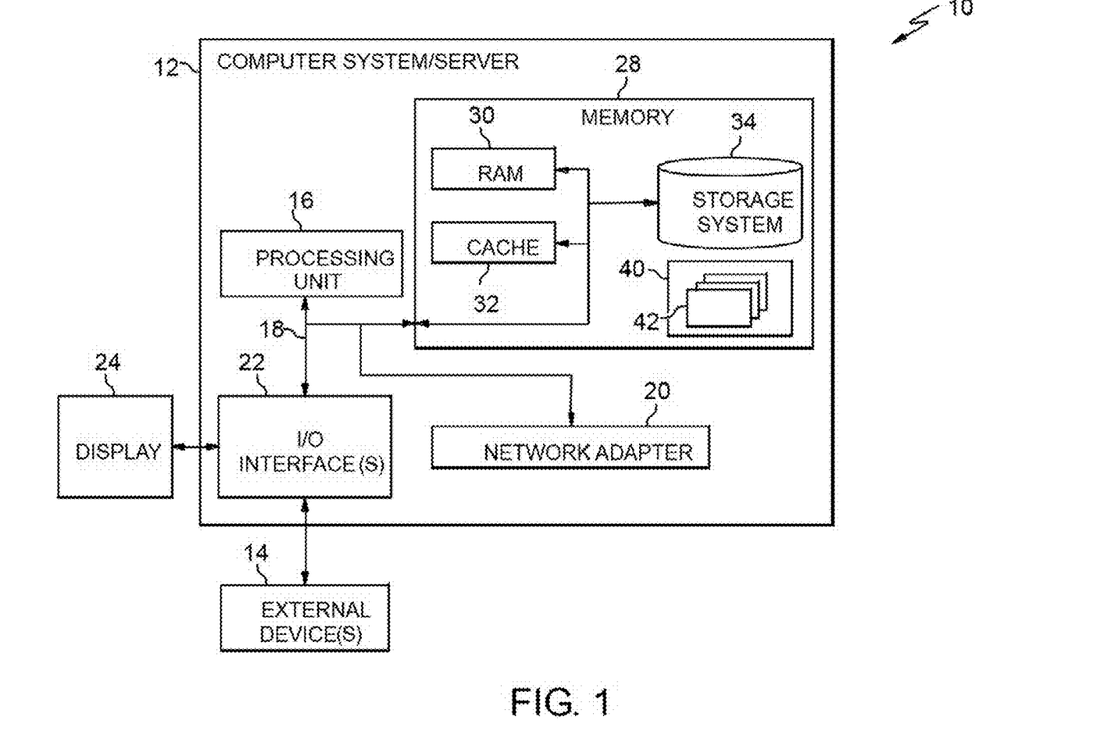
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
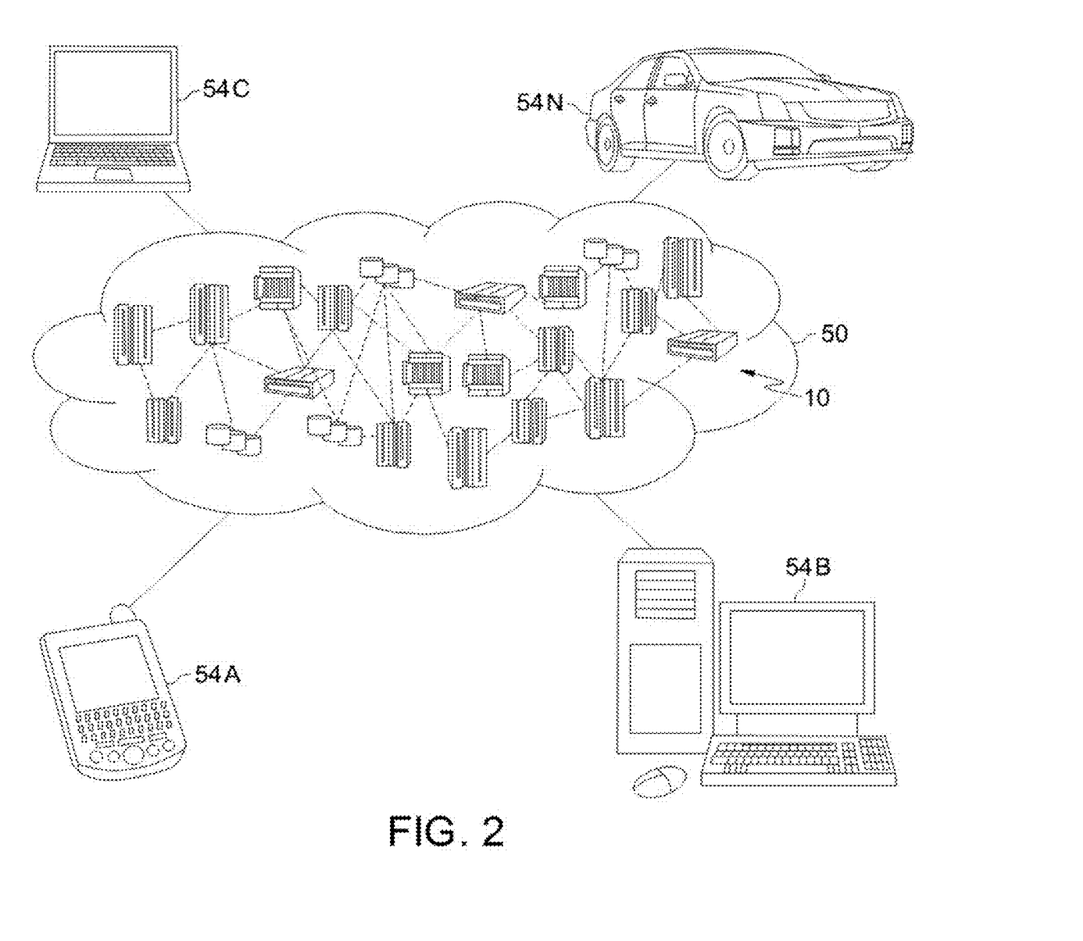
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
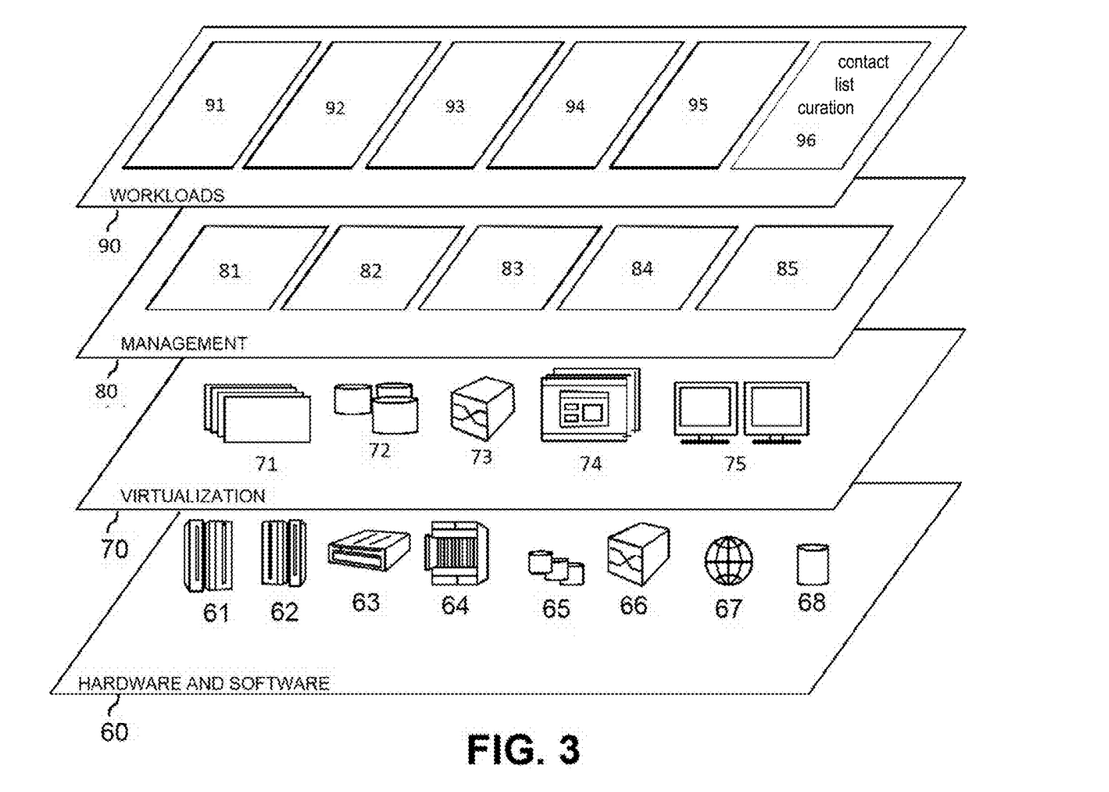
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contact list curation 96.

Implementations of the invention may include a computer system/server 12 of FIG. 1 in which one or more of the program modules 42 are configured to perform (or cause the computer system/server 12 to perform) one of more functions of the contact list curation 96 of FIG. 3. For example, the one or more of the program modules 42 may be configured to: review previous content published by a first user on a digital publishing platform; determine topics of the previous content; identify particular users of the digital publishing platform, the particular users being users that have commented on the previous content published by the first user; identify correlated users, the correlated users being those particular users that have published a pertinent comment, the pertinent comment being a comment that pertains to a portion of the previous content that has a topic that is related to a topic of new content published by the first user; assess a satisfaction level of the first user with each pertinent comment; identify, based on the assessing, a set of users of the correlated users, each of the correlated users in the set of users having published a pertinent comment having a satisfaction level above a threshold; notify the set of users that the first user has published the new content; detect new comments by the correlated users in the set of users, the new comments pertaining to the new content; assess a satisfaction level of the first user with each new comment; and update the set of users based on the satisfaction level of the first user with each new comment.

To the extent implementations of the invention collect, store, or employ personal information provided by, or obtained from, individuals (for example, the subject matter of digital media posts, contact lists, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 4:
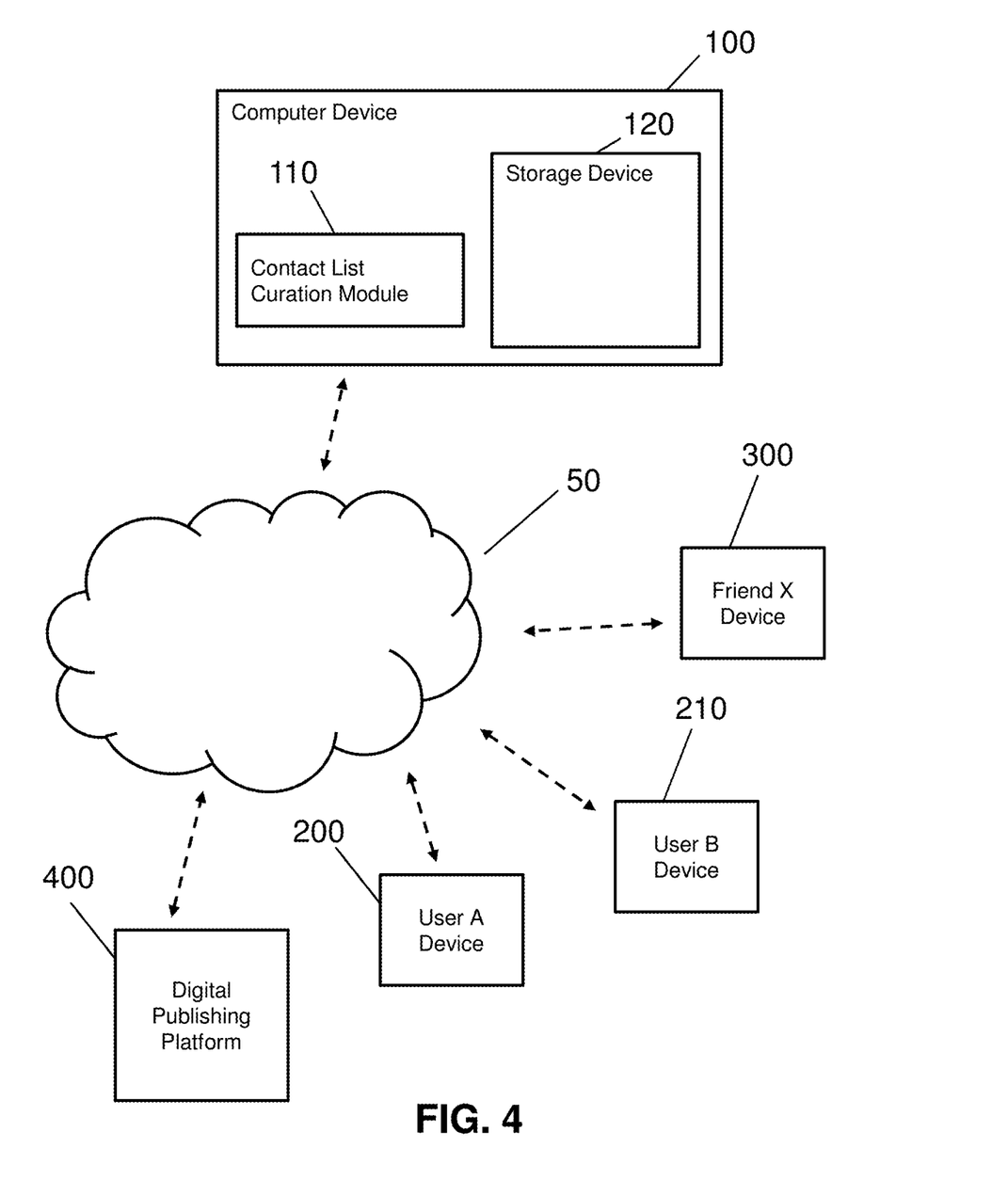
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 (such as, for example, computer system/server 12 in FIG. 1) that has a storage device 120 (such as, for example, storage system 34 in FIG. 1) and a contact list curation module 110 (such as, for example, program module 42 in FIG. 1). Computer device 100 is wirelessly connected to cloud computing environment 50. Also shown in FIG. 4 are a user A device 200, a user B device 210, and a friend X device 300. User A device 200, user B device 210, and friend X device 300 are devices (such as, for example, smart phones, tablets, computers, etc.) used by a user A, a user B, and a friend X, respectively to access a digital publishing platform 400. User A device 200, user B device 210, friend X device 300, and digital publishing platform 400 are wirelessly connected to cloud computing environment 50. In other embodiments, some or all of computer device 100, user A device 200, user B device 210, friend X device 300, digital publishing platform 400, and cloud computing environment 50 have wired connections to others of computer device 100, user A device 200, user B device 210, friend X device 300, digital publishing platform 400, and cloud computing environment 50.

In embodiments, an artificial intelligence (AI) enabled social network site, such as digital publishing platform 400, or a computer device such as computer device 100, establishes a knowledge corpus based on pattern history and feature extraction. It is noted that in some embodiments, contact list curation module 110 exists in a computer device separate from digital publishing platform 400. In other embodiments, contact list curation module 110 is incorporated into an AI enabled social network site such as, for example, digital publishing platform 400. In embodiments, the contact list curation module performs Bi-LSTM (bi-directional long short term memory) model learning on social interaction patterns among participants. Nonexclusive examples of social interaction patterns include: historically submitted social comments on any social network post, discussion chain, etc.; how other people are linking and/or reacting on those posts; the contextual relationship with the original post; who is commenting; the relationship with the user who has submitted the original post; the topic of discussion; and the contextual situation of the post. Accordingly, a knowledge corpus is created by correlating the topic of a post with: those users submitting comments; those users criticizing; the social relationship bond to the poster; how the comments are contextually related to the original post; how other people are linking the post and comments; etc.

In embodiments, contact list curation module 110 analyzes content and context and makes social correlations. In embodiments, when any social network content is posted, contact list curation module 110 analyzes the topic of the post to predict appropriate friends/connections whose comments on the post would be valuable for the current contextual situation. Accordingly, contact list curation module 110 explicitly notifies selected friends/connections to comment on the post.

In embodiments, contact list curation module 110 establishes a notification strategy. In embodiments, contact list curation module 110 identifies an appropriate section from the original post (for example, text, image, or video clip) where comments are wanted. Accordingly, contact list curation module 110 explicitly notifies the identified people and identifies the portion of the original post where comments are wanted so that the identified people understand what comments need to be provided.

In embodiments, contact list curation module 110 establishes a prediction model. In embodiments, contact list curation module 110 predicts which comments on any social network post will be valuable by predicting: (1) whose opinion, remarks, or comments are contextually related to the original post; (2) how different people will be liking the opinion/comments; and (3) how a discussion thread is started on any comments/opinions. Accordingly, based on a predicted value score of any comments/opinion, the site explicitly invites appropriate friends to comment on the post.

In embodiments, contact list curation module 110 uses an iterative feedback/reinforcement learning model. In embodiments, contact list curation module 110 executes content correlation in conjunction with a user satisfaction level in order to curate the list of friends/connections capable of responding to a given thread based on feedback obtained from previous posts, threads, or topics.

Embodiments of the invention identify a correlation of posted content with specific users of interest whose feedback matters to a user and curate the list in an iterative fashion by continuously assessing a user satisfaction level that is based on comments received. Embodiments notify a set of specific curated users proactively whose feedback is required on the posted content. The set of specific curated users is based on identified correlation and historical analysis with the user satisfaction level.

In an embodiment of the invention, a user A using user A device 200 is connected with many other people (for example, user B using user B device 210 and friend X using friend X device 300) on digital publishing platform 400. These people have multiple interests, some of which overlap with others of the people on digital publishing platform 400. Contact list curation module 110 captures the post histories of User A's connections to determine what types of overlap exists in the interests of user A and user A's connections. As user A's connections interact with posts (including user A's posts), the contact list curation module 110 captures the "important" feedback to user A. Contact list curation module 110 determines whether feedback is important by analyzing user A's likes, comment responses, and similar other tracked information.

As user A makes a social media post, contact list curation module 110 predicts the "important" audience based on feedback association. The important audience receives the content at a higher importance/visibility level to ensure the content has the highest chance of capturing their attention. The important audience responds at an improved feedback level than if no important audience was predicted. This response goes into an algorithm optimization feedback loop in contact list curation module 110 to optimize contact list curation module 110, resulting in user A's goal audiences seeing the content at a higher priority, thus driving future engagement. An iterative application of the feedback loop in contact list curation module 110 further curates the audience list based on the feedback received by user A, thus increasing user A's satisfaction level with the comments received on future posts.

Figure 5:
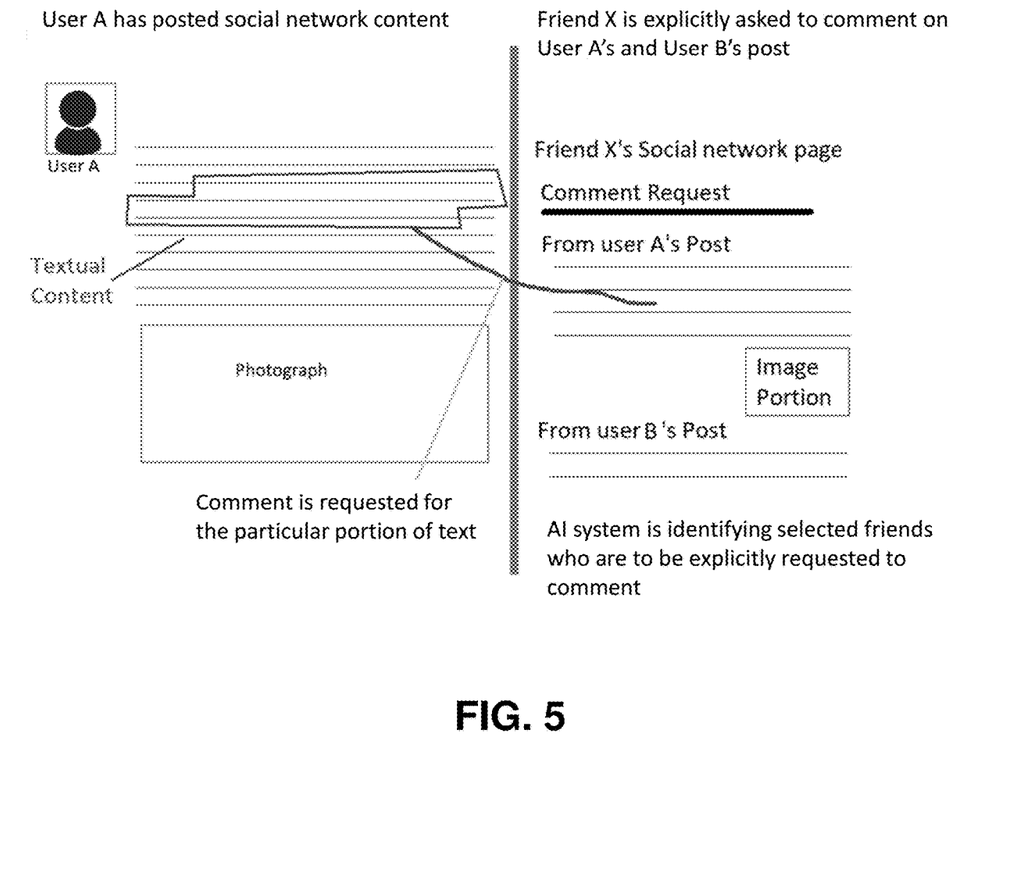
FIG. 5 shows an example of a comment request in accordance with aspects of the invention.

FIG. 5 shows a diagram that is an example of contact list curation module 110 identifying a portion of a user's social network post on which the user would like comments from the user's connections. This example also shows how important friends will explicitly be notified to submit comments on the portion of the post.

Contact list curation module 110 identifies each and every post uniquely and also identifies how users have commented on any social network post. Contact list curation module 110 identifies which comments create discussion threads, how any social network post is liked by other people, etc. Contact list curation module 110 performs contextual analysis of posts and how the posts are contextually related to a current situation. For example, one user has posted content on the social network related to a yearly financial budget just two days after the financial budge is declared. In this case the later post is related to the correct contextual situation (the earlier post).

Contact list curation module 110 also gathers information as to how different people are commenting on any post and, by comparing the original post and comments, a neuro-linguistic programming (NLP) system identifies how the comment is contextually related to the original post. Based on historical social interaction patterns, contact list curation module 110 identifies how the friends are interacting on the social network site. Using historical interaction patterns, contact list curation module 110 determines if the participating users are biased to each other or unbiased. Contact list curation module 110 considers a friend biased if there is a large discrepancy between how many times the friend is agreeing with posts made by the user and how many times the friend is disagreeing with posts made by the user.

Contact list curation module 110 identifies if any comments are getting popular, if any comments are creating a discussion thread, etc., and accordingly identifies the users who are submitting the comments. Contact list curation module 110 identifies the contributions of various users to identify which topics they are interacting with, their skills, etc. For example, Friend A always submits comments on financial related topics, etc.

Contact list curation module 110 performs machine learning on the above data to correlate topic wise: who is making comments; how the comments are related to the original post; whose comments are getting popular and starting discussion threads; who corrects, supports, or counters the original post; the skills of the persons who are commenting; the social network bond with the poster; etc. Accordingly, the system creates the knowledge corpus in this manner.

Figure 6:
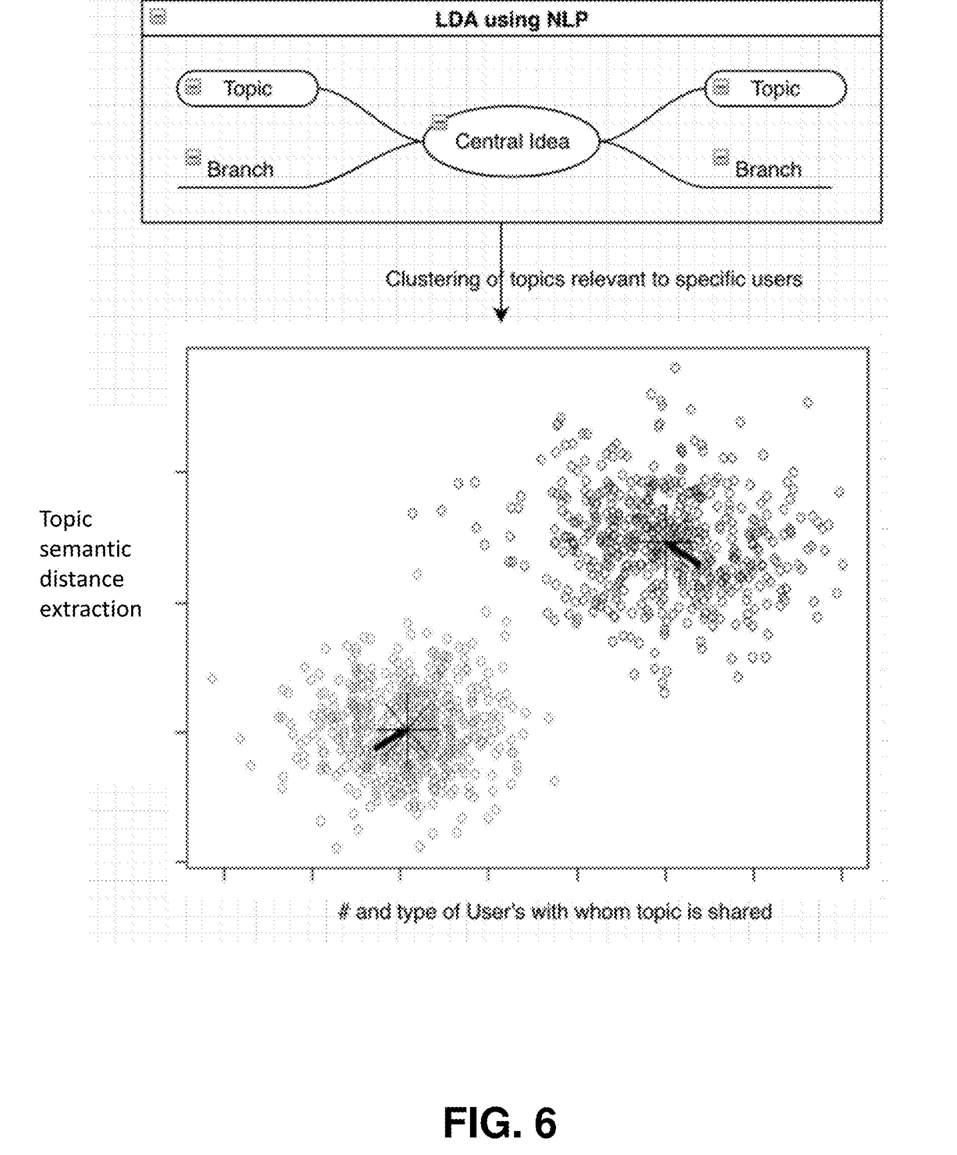
FIG. 6 shows an example of the use of machine learning in accordance with aspects of the invention.

FIG. 6 shows one example of machine learning used in embodiments of the invention. This example is just one example of deep learning that is applied by embodiments of the invention. In this example, a Bi-LSTM (with recurrent neural network) model running, for example, in contact list curation module 110, is used to understand the original post. Topic features of the original post are extracted from the content of the original post via latent Dirichlet allocation (LDA) using NLP. Contact list curation module 110 induces reasoning hop via the Bi-LSTM model in order to determine the set of users whose feedback is required, which sets the established knowledge corpus over a time duration T. Contact list curation module 110 then iteratively assesses the user's satisfaction level with comments and monitors the comments in order to qualify a subset/curated list of commenters/trusted friends who are to be notified for commenting on a post pertaining to a specific topic in order to meet user's objective of satisfaction.

In embodiments, when a user submits a social network post, contact list curation module 110 identifies (using the AI knowledge corpus) which portion of the post needs comments, who can make comments, whose comments can improve the post, etc. The system identifies the particular portion of the post and explicitly notifies the identified people and asks them to submit comments on the particular portion of the post.

Relating the above to FIG. 5, user A posts content to a social network. The content includes textual content and a photograph. User A wants to solicit comments on user A's post from a set of contacts that is better suited to provide useful comments. Using contact list curation module 110, user A selects a particular portion of the textual content and requests comments on that particular portion. FIG. 5 shows a friend X's social network page and how the comment request from user A is displayed. Also shown as part of the comment request is a portion of a user B's post that is also related to user A's post. The portion of user B's post is included as relevant information that might be considered by friend X when friend X prepares a comment on user A's post. In embodiments, the portion of user B's post is added to the comment request by user A. In other embodiments, contact list curation module 110 automatically adds the portion of user B's post to the comment request based on some or all of the factors listed above.

Figure 7:
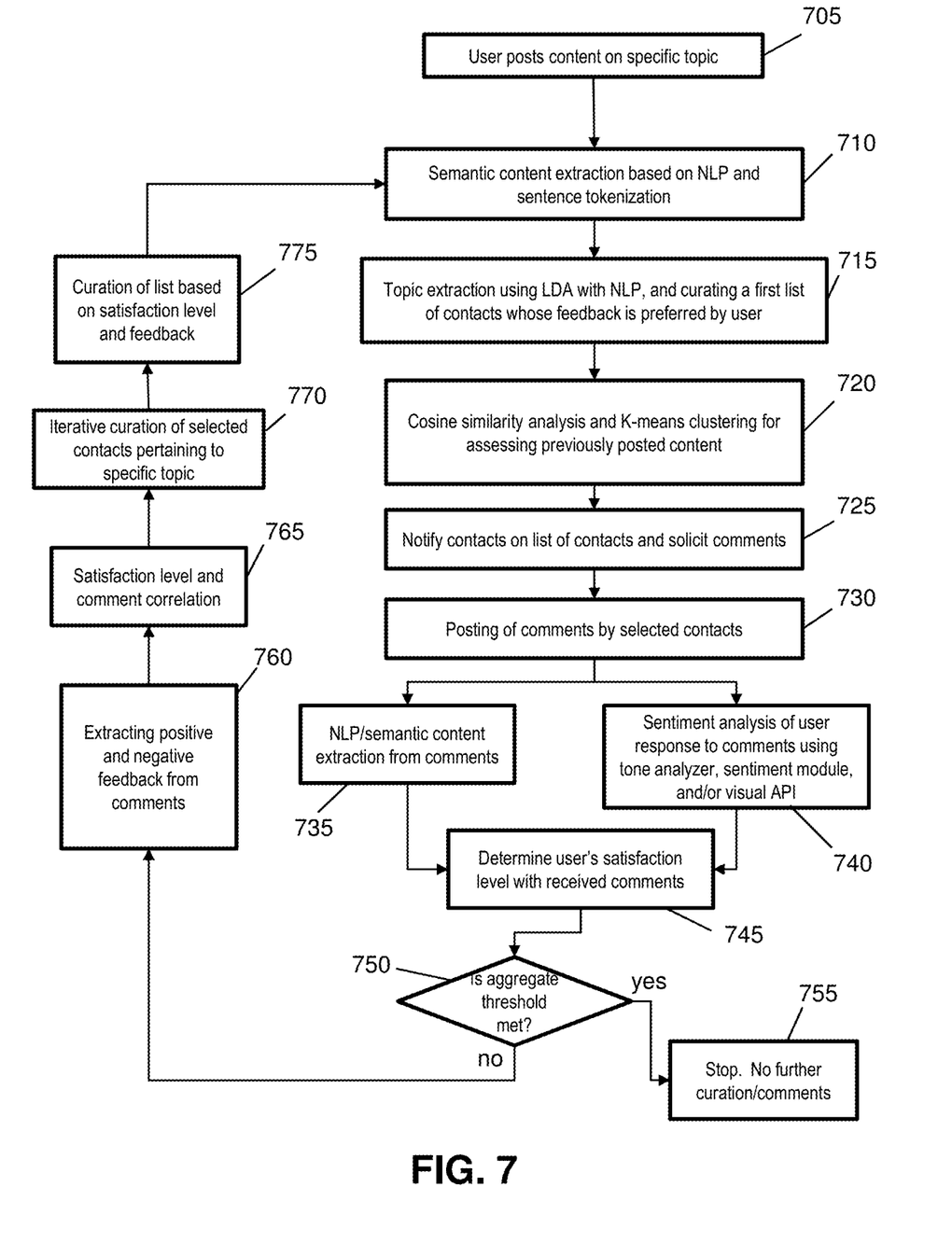
FIG. 7 shows a flow chart of an exemplary method in accordance with aspects of the invention.

FIG. 7 shows a flow chart of an exemplary method in accordance with aspects of the present invention. Steps of the method may be carried out in the environment of FIG. 4 and are described with reference to elements depicted in FIG. 4.

At step 705, a user posts content on a specific topic on digital publishing platform 400. In embodiments, the content is text, graphical, photographic, video, or any combination of these. At step 710, contact list curation module 110 performs semantic content extraction on the post based on NLP and sentence tokenization to determine the topic of the post. Non-exclusive examples of topics include home improvement, plumbing, vehicles, finances, a particular celebrity, augmented reality, etc. At step 715, contact list curation module 110 performs topic extraction (based on the topic determined in step 710) using LDA and NLP to curate a first list of contacts whose feedback is preferred by the user. In embodiments, the first list of contacts includes friends who have posted content pertaining to the same or a related topic. At step 720, contact list curation module 110 performs cosine similarity analysis and K-means clustering to assess content previously posted by the user and the associated comments posted by contacts to further refine the list of contacts. In embodiments, the system finds friends that have commented on previous posts by the user in a manner that was beneficial to the user. At step 725, contact list curation module 110 notifies the contacts on the list of contacts about the post and solicits comments on the post. In embodiments, the notification is a Comment Request that visually appears on the contacts' user interface for digital publishing platform 400.

At step 730, contact list curation module 110 receives comments posted by contacts on the list of contacts refined in step 720. In embodiments, the comments are text comments, bitmap images, "likes", or other forms of responses. At step 735, contact list curation module 110 uses NLP and/or semantic content extraction to determine the content of each comment left by the contacts. Non-exclusive examples of the content of the comments are topic, positivity, negativity, detailed descriptions, length of comment, etc. At step 740, contact list curation module 110 analyzes the user's sentiment with regard to each comment using, for example, a tone analyzer, a sentiment module, and/or a visual application program interface (API). In embodiments, contact list curation module 110 determines the user's sentiment (reaction) with regard to a comment by analyzing the user's response to the comment. This response can be a "like" or other posted response, or it can be a visual or oral response detected by a camera, microphone, or other sensor.

At step 745, contact list curation module 110 determines a user satisfaction level with each comment received based on the results of steps 735 and 740. For example, in embodiments, a tone analyzer receives a sound made by the user that is normally associated with dissatisfaction and links that to the comment being viewed by the user at the time of making the sound. In this example, contact list curation module 110 determines that the user is dissatisfied with the comment and applies a low user satisfaction level to the comment. Contact list curation module 110 then determines an aggregate user satisfaction level with regard to all the comments.

At step 750, contact list curation module 110 determines if the aggregate user satisfaction level is above a threshold. If the aggregate user satisfaction level is above the threshold, then processing continues to step 755 and no further comments are solicited. If the aggregate user satisfaction level is not above the threshold, then contact list curation module 110 determines that more curation of the contact list is needed and processing proceeds to step 760.

At step 760, contact list curation module 110 extracts positive and negative feedback from the comments received. In embodiments, the feedback is extracted by contact list curation module analyzing the comment for text or other indicia that is associated with either positive or negative response. At step 765, contact list curation module 110 correlates the user satisfaction level of each comment with that comment. At step 770, contact list curation module 110 iteratively curates the contacts pertaining to the specific topic of the post. In embodiments, contact list curation module 110 removes those contacts whose comments are determined to not be relevant to topic of the post from the list. At step 775, contact list curation module 110 curates the contact list based on the user satisfaction level (with the specific comments) and the user responses to the specific comments from step 740. In embodiments, contact list curation module 110 removes those contacts whose comments are determined to not be helpful from the list. Processing then continues to step 710 where contact list curation module 110 repeats the process of selecting contacts and soliciting comments until the desired threshold is achieved in step 750.

Figure 8:
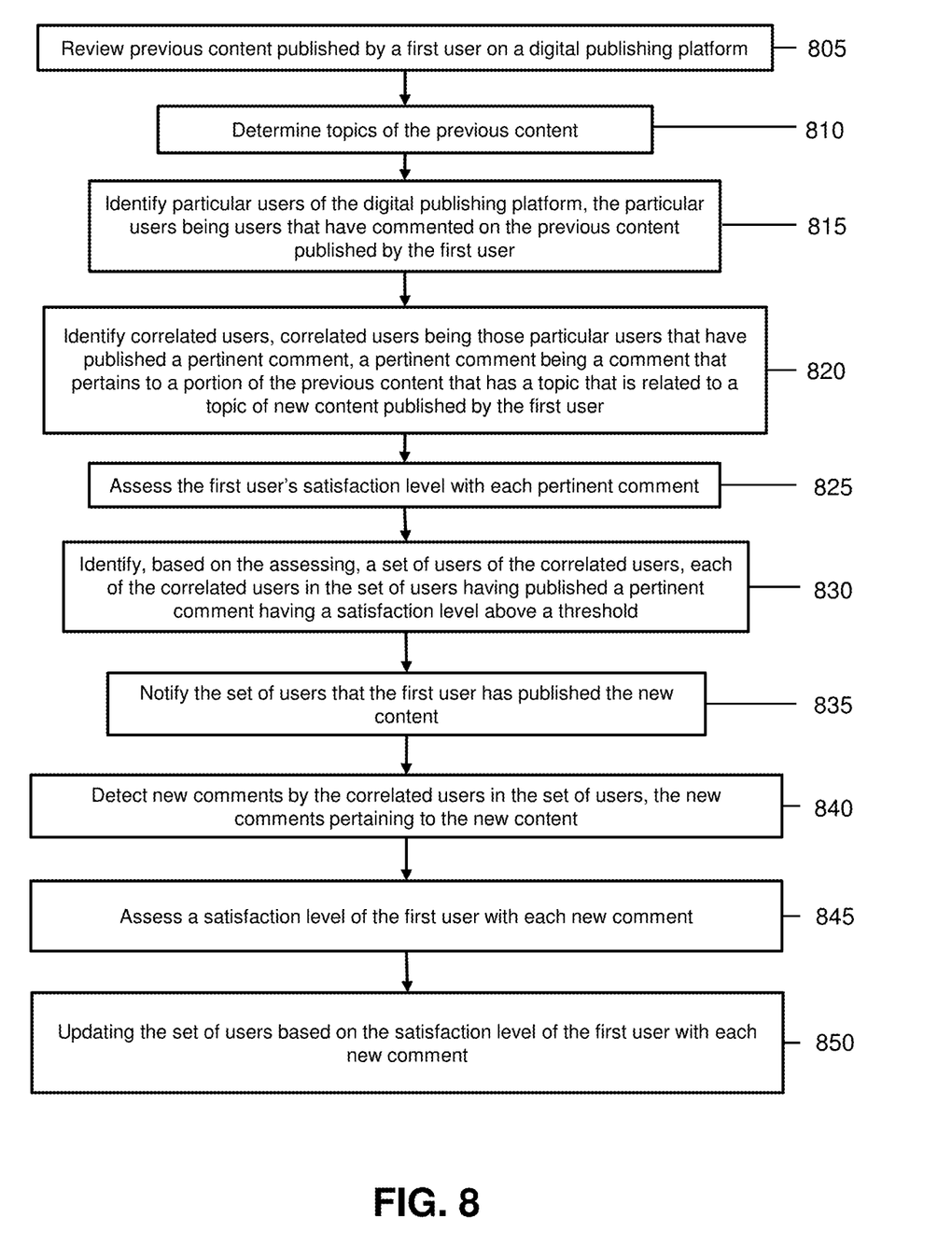
FIG. 8 shows a flow chart of an exemplary method in accordance with aspects of the invention.

FIG. 8 shows a flowchart of an exemplary method in accordance with aspects of the present invention. Steps of the method may be carried out in the environment of FIG. 4 and are described with reference to elements depicted in FIG. 4.

At step 805, contact list curation module 110 reviews previous content published by a first user on a digital publishing platform. In embodiments, the content is posts on a social network site, or other posts made by the user. At step 810, contact list curation module 110 determines topics of the previous content. In embodiments, contact list curation module 110 analyzes posts made previously by the user to determine the topic of those posts. At step 815, contact list curation module 110 identifies particular users of the digital publishing platform, the particular users being users that have commented on the previous content published by the first user. In embodiments, contact list curation module 110 eliminates from consideration those users that have never commented on a post by the user. At step 820, contact list curation module 110 identifies correlated users, correlated users being those particular users that have published a pertinent comment, a pertinent comment being a comment that pertains to a portion of the previous content that has a topic that is related to a topic of new content published by the first user. In embodiments, contact list curation module 110 forms a list of users that have previously commented on posts made by the user that relate to a new post made by the user. At step 825, contact list curation module 110 assesses the first user's satisfaction level with each pertinent comment. In embodiments, contact list curation module 110 compares the user satisfaction level of each pertinent comment with a threshold. At step 830, contact list curation module 110 identifies, based on the assessing in step 825, a set of users of the correlated users, each of the correlated users in the set of users having published a pertinent comment having a satisfaction level above a threshold. In embodiments, contact list curation module 110 eliminates from consideration those users whose previous comments fail to exceed the predetermined threshold of user satisfaction. At step 835, contact list curation module 110 notifies the set of users that the first user has published the new content. In embodiments, contact list curation module 110 notifies the set of users by sending an invitation for comment to each correlated user on the set of users. At step 840, contact list curation module 110 detects new comments by the correlated users in the set of users, the new comments pertaining to the new content published in step 835. In embodiments, contact list curation module 110 receives the new comments through the social network platform on which the user posted the new content. At step 845, contact list curation module 110 assesses a satisfaction level of the first user with each new comment. In embodiments, contact list curation module 110 determines the user satisfaction level of each comment by accessing the existence or absence of particular words or phrases in the comment. At step 850, contact list curation module 110 updates the set of users based on the satisfaction level of the first user with each new comment. In embodiments, the updated set of users is used to solicit further comments on the new content. In embodiments, the updated set of users is used to solicit comments on future posts by the first user that are related to the topic of the current content (the "new content" in FIG. 8).

Although some of the examples presented herein relate to social media sites, it is noted that embodiments of the invention include overlays on new or existing sites or systems such as, for example, shopping sites or other sites that receive comments from users.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    identifying, by a computer device, particular users of a digital publishing platform, the particular users being users that have commented on previous content published by a first user;
    identifying, by the computer device, correlated users, the correlated users being those particular users that have published a pertinent comment to previous published content by the first user;
    assessing, by the computer device, a satisfaction level of the first user of each pertinent comment to the previous published content;

qualifying, by the computer device, a set of users from the correlated users, providing a qualified set of users, the qualified set of users being selected to be notified for requesting comments on a current content published by the first user, the current content pertaining to a specific topic, the qualifying comprising monitoring comments of the correlated users and determining if the monitored comments meet an objective satisfaction level of the first user, the objective satisfaction level being above a threshold;

sending a notification, by the computer device, to each of the qualified set of users to request a comment of the current content;

sending a new content notification, by the computer device, to each of the qualified set of users, responsive to the first user publishing new content;

detecting, by the computer device, new comments by the correlated users in the set of users, the new comments pertaining to the new content;

assessing, by the computer device, a satisfaction level of the first user with each new comment comprising determining a visual or oral response by the first user detected by a camera or a microphone;

updating, by the computer device, the qualified set of users based at least on the satisfaction level of the first user with each new comment;

iteratively updating, by the computer device, the qualified set of users, and sending a request for comments to the updated qualified set of users, responsive to at least one of additional comments being posted for the current content published by the first user or to comments posted for the new content published by the first user, wherein the iteratively updating comprises further assessing the satisfaction level of the first user to comments posted by each user of the set of users to at least one of the current content or the new content, wherein the further assessing is based at least on a relevance of the comments to the specific topic pertaining to the previous published content or an aggregate satisfaction level of the first user, the aggregate satisfaction level being a conglomeration of the satisfaction levels of the first user with each new comment;

sending a notification, by the computer device, to request an additional comment of the current content, the notification sent to each of the updated set of users;

wherein the iteratively updating of the qualified set of users is repeated until the aggregate satisfaction level exceeds an aggregate threshold.

2. The computer-implemented method of claim 1, further comprising:

reviewing, by the computer device, the previous content published by the first user on the digital publishing platform; and determining, by the computer device, topics of the previous content, wherein the pertinent comment is a comment that pertains to the previous content that has a topic that is related to a topic of the new content published by the first user.

3. The computer-implemented method of claim 1, wherein the assessing the satisfaction level of the first user with a particular one of the new comments is based on an interaction of the first user with the particular one of the new comments.

4. The computer-implemented method of claim 3, wherein the interaction comprises publishing a response to the particular one of the new comments on the digital publishing platform.

5. The computer-implemented method of claim 3, wherein the interaction comprises a visible response by the first user, an indication of the visible response being received by the computing device as output from an image capturing device.

6. The computer-implemented method of claim 5, wherein the image capturing device is on a user device used by the first user to review the particular one of the new comments.

7. The computer-implemented method of claim 3, wherein the interaction comprises an audible response by the first user, an indication of the audible response being received by the computing device as output from an audio capturing device.

8. The computer-implemented method of claim 7, wherein the audio capturing device is on a user device used by the first user to review the particular one of the new comments.

9. The computer-implemented method of claim 1, further comprising requesting, by the computer device, that the set of users provide comments on the new content.

10. The computer-implemented method of claim 1, wherein the computer device includes software provided as a service in a cloud computing environment.

11. A computer program product, the computer program product comprising a computer readable storage medium having program instructions embodied therewith, the program instructions executable by a computing device to cause the computing device to:

identify particular users of a digital publishing platform, the particular users being users that have commented on previous content published by a first user;

identify correlated users, the correlated users being those particular users that have published a pertinent comment to previous published content by the first user;

determine a specific topic of a current post published by the first user;

assess a satisfaction level of the first user of each pertinent comment to the previous published content;

qualify a set of users from the correlated users, providing a qualified set of users, the qualified set of users being selected to be notified for requesting comments on the current post by the first user based on the determined specific topic by monitoring comments of the correlated users and determining if the monitored comments meet an objective satisfaction level of the first user, the objective satisfaction level being above a threshold;

notify the qualified set of users, and refrain from notifying the correlated users that are not in the qualified set of users, that the first user has published new content;

detect new comments by the correlated users in the set of users, the new comments pertaining to the new content;

assess a satisfaction level of the first user with each new comment via a sentiment module comprising determining a visual or oral response by the first user detected by a camera or a microphone; and iteratively update the qualified set of users, wherein to iteratively update comprises program instructions to: further assess the satisfaction level of the first user to comments posted by each user of the set of users to at least one of the current post and the new content, wherein the further assessing is based at least on a relevance of the comments to the specific topic of the current post and based on the satisfaction level of the first user with each new comment.

12. The computer program product of claim 11, further comprising program instructions executable by a computing device to cause the computing device to review the previous content published by the first user on the digital publishing platform; and determine topics of the previous content, wherein the pertinent comment is a comment that pertains to the previous content that has a topic that is related to a topic of the new content published by the first user.

13. A system comprising:

a processor, a computer readable memory, and a computer readable storage medium;

program instructions to review previous content published by a first user on a digital publishing platform;

program instructions to determine topics of the previous content;

program instructions to identify particular users of the digital publishing platform, the particular users being users that have commented on the previous content published by the first user;

program instructions to identify correlated users, the correlated users being those particular users that have published a pertinent comment, the pertinent comment being a comment that pertains to the previous content that has a topic that is related to a topic of new content published by the first user;

program instructions to determine a specific topic of a current post published by the first user using latent dirichlet allocation (LDA) and natural language processing (NLP);

program instructions to qualify a set of users from the correlated users, providing a qualified set of users, the qualified set of users being selected to be notified for commenting on the current post based on the determined specific topic by monitoring comments of the correlated users and determine if the monitored comments meet an objective satisfaction level of the first user, the objective satisfaction level being above a threshold;

program instructions to display a comment request to each of the qualified set of users of the correlated users, wherein the comment request displays the current post;

program instructions to assess a satisfaction level of the first user with each pertinent comment via a visual application program interface;

program instructions to determine that particular ones of the pertinent comments are not helpful based on the satisfaction level;

program instructions to identify, based on the assessing, the qualified set of users of the correlated users, each of the correlated users in the qualified set of users having published a pertinent comment having a satisfaction level above a threshold, the identifying comprising removing those correlated users whose pertinent comment is determined to not be helpful from the qualified set of users;

program instructions to notify the qualified set of users that the first user has published the new content;

program instructions to detect new comments by the correlated users in the set of users, the new comments pertaining to the new content;

program instructions to assess a satisfaction level of the first user with each new comment comprising determining a visual or oral response by the first user detected by a camera or a microphone; and program instructions to update the qualified set of users based on the satisfaction level of the first user with each new comment, wherein the program instructions are stored on the computer readable storage medium for execution by the processor via the computer readable memory.

14. The system of claim 13, wherein the assessing of the satisfaction level of the first user with a particular one of the new comments is based on an interaction of the first user with the particular one of the new comments.

15. The system of claim 14, wherein the interaction comprises a response by the first user, an indication of the response being received by the computing device as output from a user device used by the first user to review the particular one of the new comments.

16. The system of claim 13, further comprising program instructions to assess an aggregate satisfaction level of the first user, the aggregate satisfaction level being a conglomeration of the satisfaction levels of the first user with each new comment, wherein the updating of the qualified set of users is repeated until the aggregate satisfaction level exceeds an aggregate threshold.

17. The computer-implemented method of claim 1, further comprising determining a particular one of the correlated users is biased as a result of a large discrepancy between how many times the particular one of the correlated users agrees with content published by the first user and how many times the particular one of the correlated users disagrees with content published by the first user.

18. The computer-implemented method of claim 17, wherein the determining that the particular one of the correlated users is biased is based on historical interaction patterns of interactions between the particular one of the correlated users and the first user.

19. The computer-implemented method of claim 1, wherein the qualifying the set of users from the correlated users comprises assessing content previously published by the first user and associated comments posted by the correlated users, wherein the assessing comprises performing cosine similarity analysis and K-means clustering.

* * * * *